US007012757B2

(12) United States Patent
Wallerstein et al.

(10) Patent No.: US 7,012,757 B2
(45) Date of Patent: Mar. 14, 2006

(54) METHOD FOR DESIGNING A LENS SYSTEM AND RESULTING APPARATUS

(75) Inventors: Edward P. Wallerstein, Pleasanton, CA (US); John L. W. Furlan, Belmont, CA (US); Edward C. Driscoll, Jr., Portola Valley, CA (US); Robert G. Hoffman, Fremont, CA (US)

(73) Assignee: Be Here Corporation, Fremont, CA (US)

( * ) Notice: Subject to any disclaimer, the term of this patent is extended or adjusted under 35 U.S.C. 154(b) by 44 days.

(21) Appl. No.: 10/336,245

(22) Filed: Jan. 3, 2003

(65) Prior Publication Data

US 2004/0008407 A1    Jan. 15, 2004

Related U.S. Application Data

(60) Provisional application No. 60/378,772, filed on May 8, 2002.

(51) Int. Cl.
*G02B 11/00* (2006.01)
*G02B 9/00* (2006.01)

(52) U.S. Cl. .................................. 359/642; 359/662

(58) Field of Classification Search ................ 359/662, 359/642, 749, 754–756
See application file for complete search history.

(56) References Cited

U.S. PATENT DOCUMENTS 5,004,328 A * 4/1991 Suzuki et al. ............... 359/664
5,751,863 A * 5/1998 Farr ............................ 382/275

* cited by examiner

*Primary Examiner*—Georgia Epps
*Assistant Examiner*—William Choi
(74) *Attorney, Agent, or Firm*—Silicon Valley Patent Group; Edward S. Mao

(57) ABSTRACT

A method for designing a lens system that allows one design tolerance to be relaxed to enhance other lens characteristics where the aberration(s) resulting from the relaxed design tolerance can be corrected by image processing subsequent to the acquisition of the raw image containing the aberration(s). In addition, wide-angle and/or catadioptric lenses so designed can be used with cameras or other image sensors. Further, the raw image can be corrected by an image correction processor within or external to a camera system, comprised of specialized circuitry and/or an appropriately configured general-purpose computer.

8 Claims, 10 Drawing Sheets

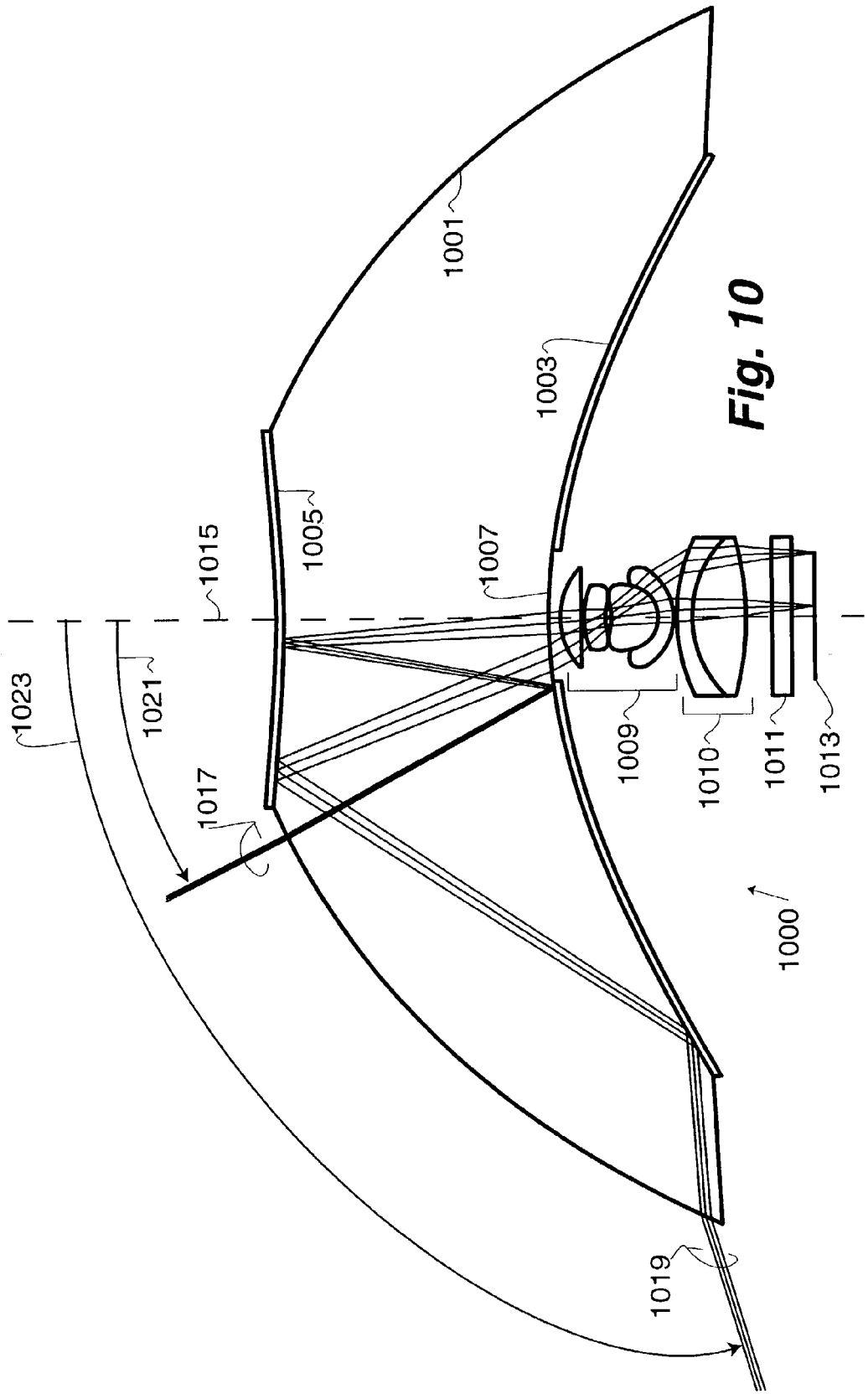

METHOD FOR DESIGNING A LENS SYSTEM AND RESULTING APPARATUS

BACKGROUND OF THE INVENTION

This application claims the benefit of U.S. Provisional Patent Application No.: 60/378,772 by Wallerstein et al., filed May 8, 2002

FIELD OF THE INVENTION

This invention relates to the field of lens design.

BACKGROUND

Wide-angle and fish-eye lenses have been designed to closely adhere to f-theta distortion. However, the design of any lens system (including optical, radiation, electromagnetic or other lens system) is a complex problem involving the balancing of many co-dependent and interrelated parameters. A lens designer generally balances these parameters to create a lens system design suitable for a particular purpose. Often, the image captured from a panoramic or a very wide-angle lens system is required to have distortion that only minimally diverges from an f-theta relationship. In the process of designing such a lens system, the lens designer must often make significant alterations to other lens system characteristics to minimize the deviation in f-theta.

Recently, there have been advances in the technology for rapidly dewarping images. Some of these advances are disclosed, for example, in U.S. Pat. No. 5,796,426 and in U.S. Pat. No. 6,369,818 both hereby incorporated by reference in their entirety. These techniques allow distorted images to be corrected (dewarped) rapidly and accurately. For example, a raw image captured through a lens system that significantly deviates from f-theta can now be corrected (using specialized analog and/or digital electronics; and/or appropriately programmed computers and/or specialized programmed processing circuits) to provide a corrected image that is equivalent to one taken using a lens system with no f-theta deviation.

We have come to the realization that the constraints on a first aspect of the lens system design can be relaxed to optimize other characteristics of the lens system's performance and/or cost when the additional aberration in the raw image due to the relaxed constraint on the first aspect can be corrected subsequent to the capture of the raw image (for example, by processing the raw image to remove the additional aberration). Thus, by relaxing a design tolerance on a lens system we can enhance other characteristics of that lens system with the expectation that the aberration resulting from the relaxed design tolerance will be removed when the raw image is subsequently processed. One example of a lens system that produces such an image is one that has significant f-theta deviation.

Thus, for lens system applications where it is known that the raw image captured through the lens system will be subject to image processing, it would be advantageous to design the lens system to improve other lens system characteristics by allowing increased, but correctable aberration into the lens system design.

SUMMARY OF THE INVENTION

A method for designing a lens system is disclosed where a first design tolerance for the lens system is relaxed. The first design tolerance specifies an allowed aberration in a raw image produced through the lens system where the allowed aberration in the raw image can be corrected by an image correction processor. The relaxed first design tolerance allows a lens system characteristic to be enhanced that would have been limited by a less relaxed first design tolerance.

A raw image captured from a lens system so designed can be corrected to remove the aberration by an image correction processor to provide a corrected image comparable to an image taken from a lens system with a less relaxed first design tolerance but having the enhanced lens system characteristics.

In addition, a method is disclosed for capturing a raw image, correcting the allowed aberration in the raw image and for presenting a corrected image or a corrected view into the raw image.

Furthermore, a lens system is disclosed where the first design tolerance is the f-theta deviation and the improved lens characteristic is that of lower cost.

The foregoing and many other aspects of the present invention will no doubt become obvious to those of ordinary skill in the art after having read the following detailed description of the preferred embodiments that are illustrated in the various drawing figures.

DESCRIPTION OF THE DRAWINGS

FIG. 10 illustrates an aspherical catadioptric lens system designed using the process of FIG. 1.

DESCRIPTION OF THE PREFERRED EMBODIMENTS

Figure 1:
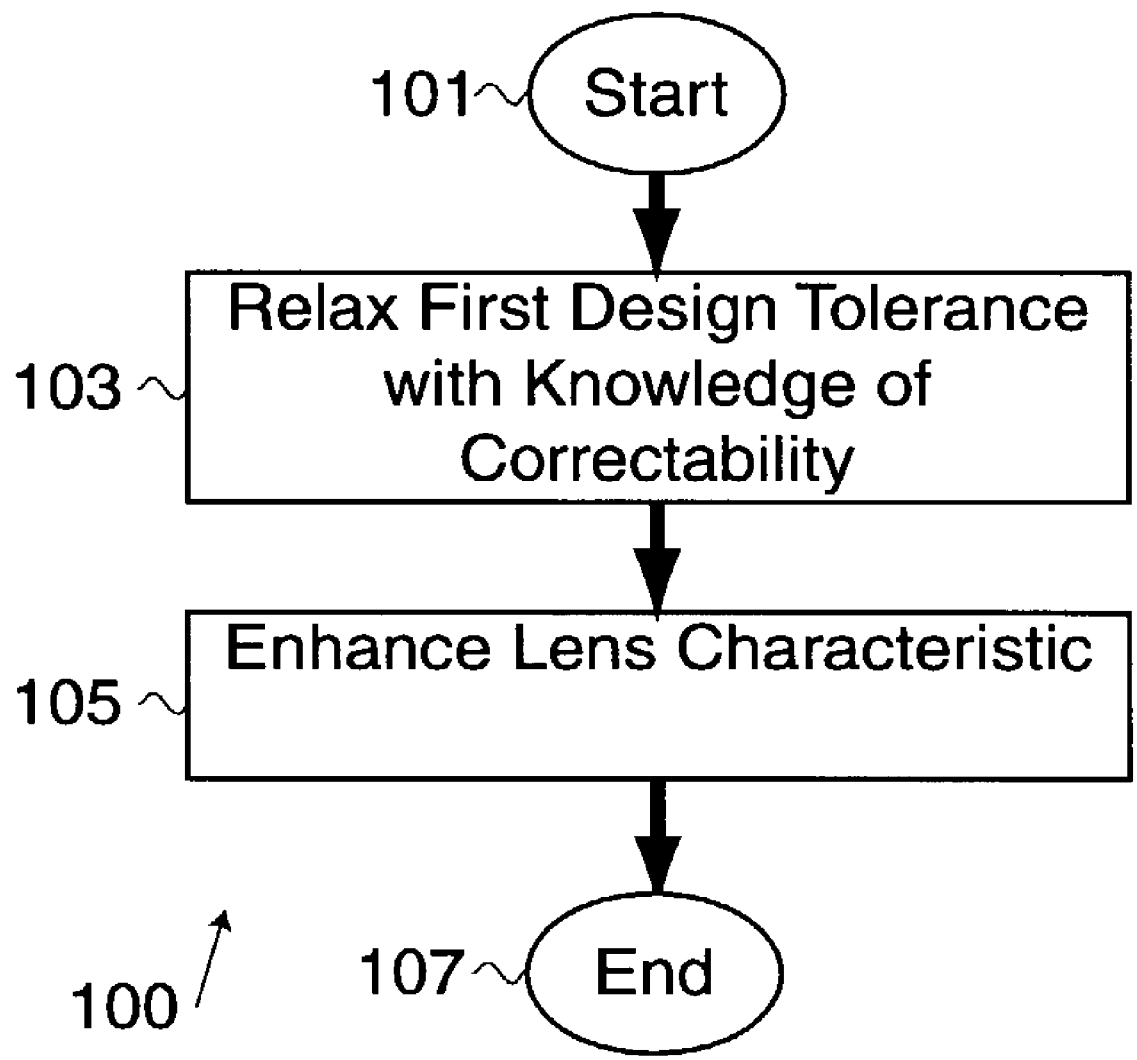
FIG. 1 illustrates a lens system design process in accordance with a preferred embodiment.

We have realized that it is no longer required to design lenses to minimize particular aberration(s) (for example, but without limitation, deviation in f-theta) where the raw image captured through the lens system is known to be subject to subsequent processing. Thus, we can use aberration correction devices (for example but without limitation, circuitry, special purpose programmed devices, and general purpose programmed computers) to correct aberrations in the raw image captured through such a lens system with the result of generating a corrected image that is equivalent to an image that would be captured through a lens system without the aberration. For example, one such aberration in f-theta lenses is the plus or minus deviation from f-theta.

We have also realized that the relaxation of one design tolerance in a lens system allows other design tolerances in the lens system to be made more restrictive (thus enhancing the lens characteristic affected by the tolerance). Thus, although such a lens system captures an image with more aberration related to the one design tolerance, other lens system characteristics will be enhanced. The resulting raw image captured through the lens system can be processed (electronically and/or digitally) to correct the aberration due to the relaxation of the one design tolerance while still maintaining the benefits of the enhanced lens system characteristics.

Thus, we have developed a method for designing a lens system that includes steps for relaxing a first design tolerance (such as increasing the allowable amount of f-theta deviation for the lens) and for enhancing a lens system characteristic that would be otherwise limited by a less relaxed first design tolerance. For example, (where the first design tolerance is the deviation from f-theta) by increasing the allowable amount of f-theta deviation, the wide-angle lens systems disclosed herein can have the following (for example, but without limitation) resulting enhanced lens system characteristics:

Reduced maximum incident angle between the light and the lens surface(s): this reduction in the maximum incident angle improves light transmission and reduces the sensitivity of the lens system to optical alignment during manufacturing (thus reducing cost). In addition, optical coatings are easier to design and apply.

Reduced aberrations such as coma, astigmatism, and lateral color correction: these improvements can result from allowing deviations in f-theta.

Smaller leading elements: processing of the image to remove aberrations allows smaller leading elements in the lens system. This reduces (for example, but without limitation) the manufacturing cost, allows for a smaller lens footprint, and lens system weight.

An image correction processor can be used to correct the allowed aberration in a raw image captured through the lens system. The raw image can be captured directly by a digital sensor, by an analog sensor producing signals used to create a digitized image, or by a photographic film that is subsequently scanned to create a digitized image. Once the digital version of the raw image is created or captured, it can be corrected by the image correction processor.

Thus, for example, where the first design tolerance is the allowable amount of f-theta deviation, the image correction processor corrects the f-theta deviation in the raw image resulting in a corrected image having substantially all of the f-theta deviation removed. The corrected image is equivalent to an image taken by an f-theta lens system. In addition, the corrected image includes any image-related advantages resulting from the enhanced lens system characteristics enabled by the increased f-theta deviation allowed in the lens system.

Lens system characteristics improved by the relaxation of the first design tolerance can include image-related advantages as well as advantages in the physical characteristics of the lens system (such as the number, size, shape and/or cost of the refracting and/or reflecting elements included in the lens system).

In addition, the image correction processor (when implemented using analog circuitry) can be used to directly correct an analog representation of the raw image.

FIG. 1 illustrates a lens system design process 100 that can be used when the lens designer knows that the raw image captured by the lens system under design will be subject to image processing. The lens system design process 100 starts at a start terminal 101 and continues to a 'relax first design tolerance' step 103. The 'relax first design tolerance' step 103 is where the lens system designer determines which design tolerance(s) will be relaxed. Prior to selecting the design tolerance to be relaxed, the lens designer needs to know that the aberration of the raw image resulting from the relaxed design tolerance will be corrected by subsequent image processing. One example (but without limitation) of a design tolerance that can be relaxed is the amount of f-theta deviation allowed in the lens system.

An 'enhance lens characteristic' step 105 is where the lens system designer enhances a lens system characteristic that would have been limited by a stricter design tolerance relative to the relaxed design tolerance. The lens characteristics include, but are not limited to, the types of material used in the lens system, the size of the lens system, the cost of the lens system, the optical characteristics of the lens system, and/or the distortion in the lens system.

The 'relax first design tolerance' step 103 and the 'enhance lens characteristic' step 105 can be repeated while developing the lens system design. Generally, a computer application is used to perform ray-tracing functions to determine the performance characteristics of the design and in addition, the lens designer evaluates the difficulty and costs of manufacturing the lens system.

An end terminal 107 indicates the completion of the lens system design process 100.

One skilled in the art will understand that the above steps need not be performed in any particular sequence. For example, once the designer is aware that a raw image can be subsequently processed to correct aberrations that result from relaxing a design tolerance, the designer can enhance other lens characteristic(s) that would have been limited by a more restricted design tolerance. One aspect of the inventive process is where the designer first relaxes the tolerance and then determines what lens characteristics can be enhanced. Another aspect of the inventive process is where the designer enhances a lens characteristic that degrades a design tolerance that causes correctable aberrations.

An example of the results of the lens system design process 100 are the lens systems designs subsequently described with respect to FIG. 6, FIG. 8, and FIG. 9A and FIG. 10.

Figure 2:
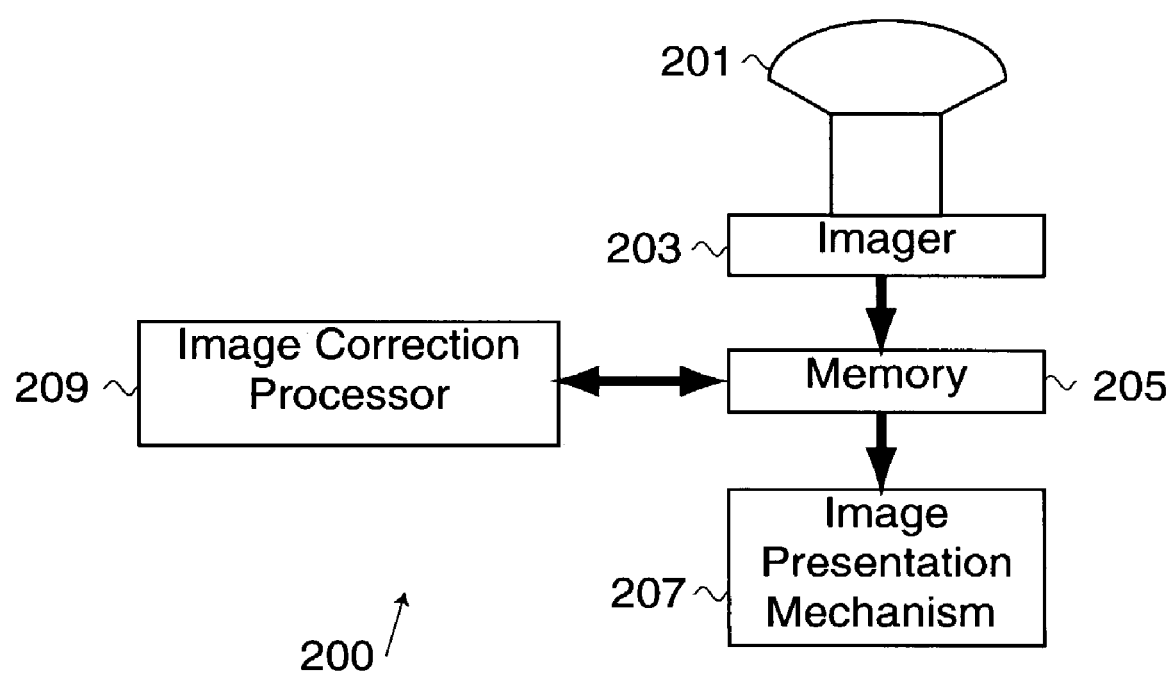
FIG. 2 illustrates how an image captured using a lens system designed as in FIG. 1 can be used in accordance with a preferred embodiment.

FIG. 2 illustrates an image presentation system 200 that can be used to view images captured using lenses designed in accordance with the method of FIG. 1. The image presentation system 200 includes a lens system 201 that is designed with a relaxed first design tolerance (such as an allowable f-theta deviation). The lens system 201 is in optical communication with an imager 203. The imager 203 produces a digital image that is loaded into a memory 205 where the data representing the raw image can be accessed. Once the digitized image is in the memory 205, it can be presented by an image presentation mechanism 207 and/or accessed by an image correction processor 209. The image correction processor 209 accesses the digitized raw image and corrects aberrations in the digitized raw image (and optionally performs other image processing). Once the digitized image is corrected, it can be presented by the image presentation mechanism 207.

The imager 203 can be a digital sensor such as a CCD or CMOS sensor array, can be an analog sensor coupled to a digitizer, or can be film that is subsequently scanned and digitized. The digital information representing the image captured by the lens system 201 is eventually loaded into the memory 205.

When the image presentation system 200 is self-contained (for example, in a camera), the transfer of the image data from the imager 203 to the memory 205 can be accomplished using well-known designs (for example, designs for a digital camera).

In addition, the image presentation system 200 can use a network to transfer the digital image from the imager to the memory 205 (for example, by sending the raw image from the imager 203 to a computer over the Internet). One skilled in the art will understand that computer program data as well as image data can be received over the network and that the data is embodied in a carrier wave or other similar information transmission mechanism using visible or invisible electromagnetic radiation.

The image correction processor 209 can be dedicated circuitry (for example, an ASIC), a special purpose programmed processor, or a programmed general-purpose computer. The image correction processor 209 can be configured to correct only the aberration in the raw image caused by the relaxed first design tolerance (for example in a digital camera that generates images with a f-theta distortion even though the lens system deviates from f-theta). In addition, the image correction processor 209 can also include other image processing functions (for example but without limitation, image sharpening, color balancing, and other image processing functions as well as functions for generating a view into a wide-angle image).

A wide-angle image taken through an f-theta lens is distorted. A non-distorted view into the wide-angle image can be created by transforming a portion of the wide-angle image to remove the distortion. Technology for this transformation is well known in the art (for example see U.S. Pat. Nos. 5,796,426 and 6,369,818).

The image presentation mechanism 207 includes the capability to present the corrected image (and/or view) to a viewer (for example but without limitation, using a LCD display on the back of a camera body, by presenting the corrected image (and/or view) on a computer monitor or television, by recording the corrected image (and/or view) on a recording media—for example but without limitation, a magnetic tape, or disk; compact disk or DVD among others—, and/or by presenting the corrected image (and/or view) by producing a photographic or paper print in either black and white or color).

Figure 3:
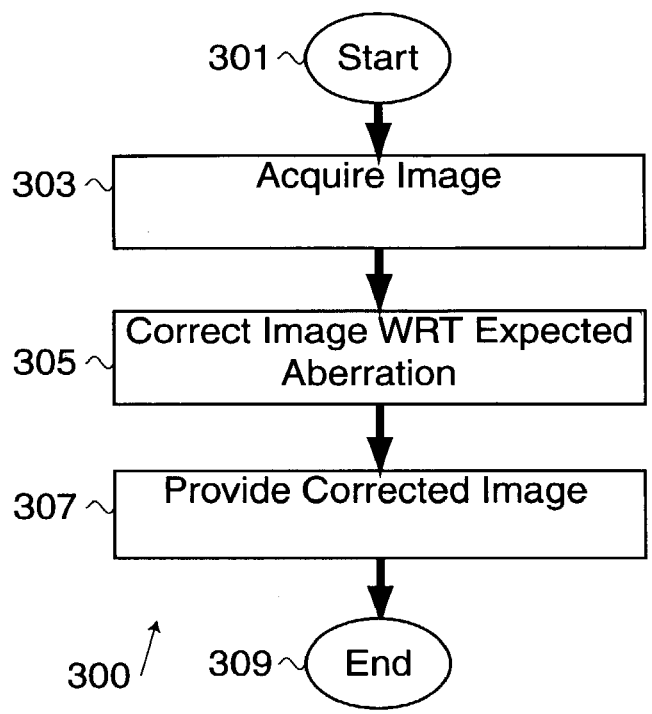
FIG. 3 illustrates a process for generating a corrected image from a raw image taken through a lens system designed using the process of FIG. 1.
Figure 4:
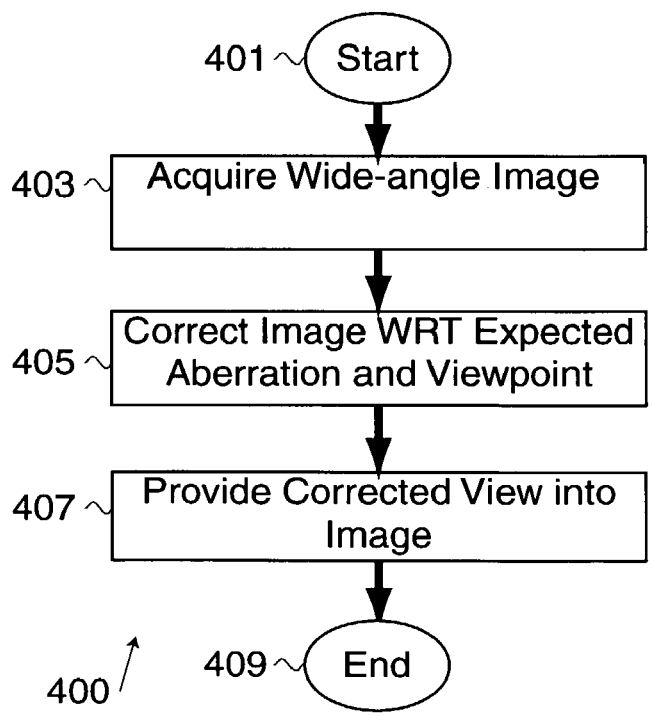
FIG. 4 illustrates a process for generating an undistorted view into a raw image taken through a lens system designed using the process of FIG. 1.

FIG. 3 and FIG. 4 illustrate two example processes that can be used to correct aberrations in a raw image captured through a lens system designed in accordance with the design methodology discussed with regard to FIG. 1. These processes can be implemented using dedicated circuitry, on a general-purpose computer configured to execute a program product (for example, software) or using other special purpose analog and/or digital circuitry. Where the implementation is on a computer, the program product can be provided embodied on a computer readable media such as a disk, tape, carrier wave or combination thereof.

FIG. 3 illustrates an image correction process 300 that can be used to correct a raw image having an aberration (for example, a raw image captured through a wide-angle lens designed in accordance with the previously described method). The image correction process 300 starts at a start terminal 301 and continues to an 'acquire image' step 303 that receives a raw image that has the expected aberrations. The raw image can be provided on a computer readable media such as a disk tape, or carrier wave, via direct connection with a camera system or via a data bus. In addition, the raw image can be captured by an image sensor within a camera system. The raw image is initially captured through a lens system designed in accordance with the method described with respect to FIG. 1. Once the raw image is acquired, a 'correct image with respect to expected aberration' step 305 processes the raw image to remove the aberration that is a result of the relaxed lens tolerance. The 'correct image with respect to expected aberration' step 305 generates a corrected image from the raw image. A 'provide corrected image step 307 makes the corrected image available (for example, by display, recordation in memory, recordation in magnetic media, recordation on optical disk, transmission of the image over a network, and/or on a tangible media such as paper or film). Finally, the image correction process 300 completes through an end terminal 309.

In one preferred embodiment, a still and/or video digital camera is equipped with a lens system designed as previously described and is equipped with the image correction processor 209. Once the raw image is captured through the lens system, acquired via the imager 203 and stored in the memory 205, the image correction processor 209 corrects the raw image so that the camera provides a corrected image that is equivalent to an image taken through a lens system having a tighter design tolerance while still having the enhanced lens system characteristics that are the result of the relaxed design tolerance.

In another preferred embodiment, a still and/or video digital camera is equipped with a lens system designed as previously described. The camera captures a digital representation of a raw image. The raw image is then transferred to, and is acquired by, a general-purpose computer configured as the image correction processor 209 (for example, by executing a program) that generates a corrected image from the raw image. The raw image can be received by the computer by reading the digital representation of the raw image from the camera, from a memory or disk written by the camera, by receipt of the raw image from a network or by any other method of transferring a digital representation of an image to a computer.

If the lens system is a wide-angle lens that deviates from f-theta, the corrected image will be identical to an image captured by an f-theta lens system that has the enhanced lens characteristics.

A view is a perspective-corrected image created by transforming a portion of an image captured by a wide-angle lens (for example, a fish-eye, wide-angle, panoptic, and/or catadioptric lens).

By adding aberration correction processing to well-known view generation transformations, images captured using wide-angle lens systems that have been designed as discussed with respect to FIG. 1 can also used to generate a view (the expected aberration is corrected as the view is generated). One skilled in the art will understand how to perform perspective corrected transformations.

FIG. 4 illustrates a view correction process 400 that can be used to provide a perspective corrected view into a wide-angle image captured through a lens designed as previously discussed with respect to FIG. 1. The view correction process 400 starts at a start terminal 401 and continues to an 'acquire image' step 403 that acquires the digital representation of the wide-angle image. Once the wide-angle image (the raw image) is received, a 'correct image with respect to expected aberration and viewpoint' step 405 processes a portion of the wide-angle image (as specified by the viewpoint) to remove the aberration that is a result of the relaxed lens tolerance and to provide a perspective correcting transform (a view) into the wide-angle image. A 'provide view into image' step 407 makes the digital representation of the view available (for example, by display; by recordation in memory, magnetic media, transmission of the image over a network, and/or on a tangible media such as paper or film). Finally, the view correction process 400 completes through an end terminal 409.

Figure 5:
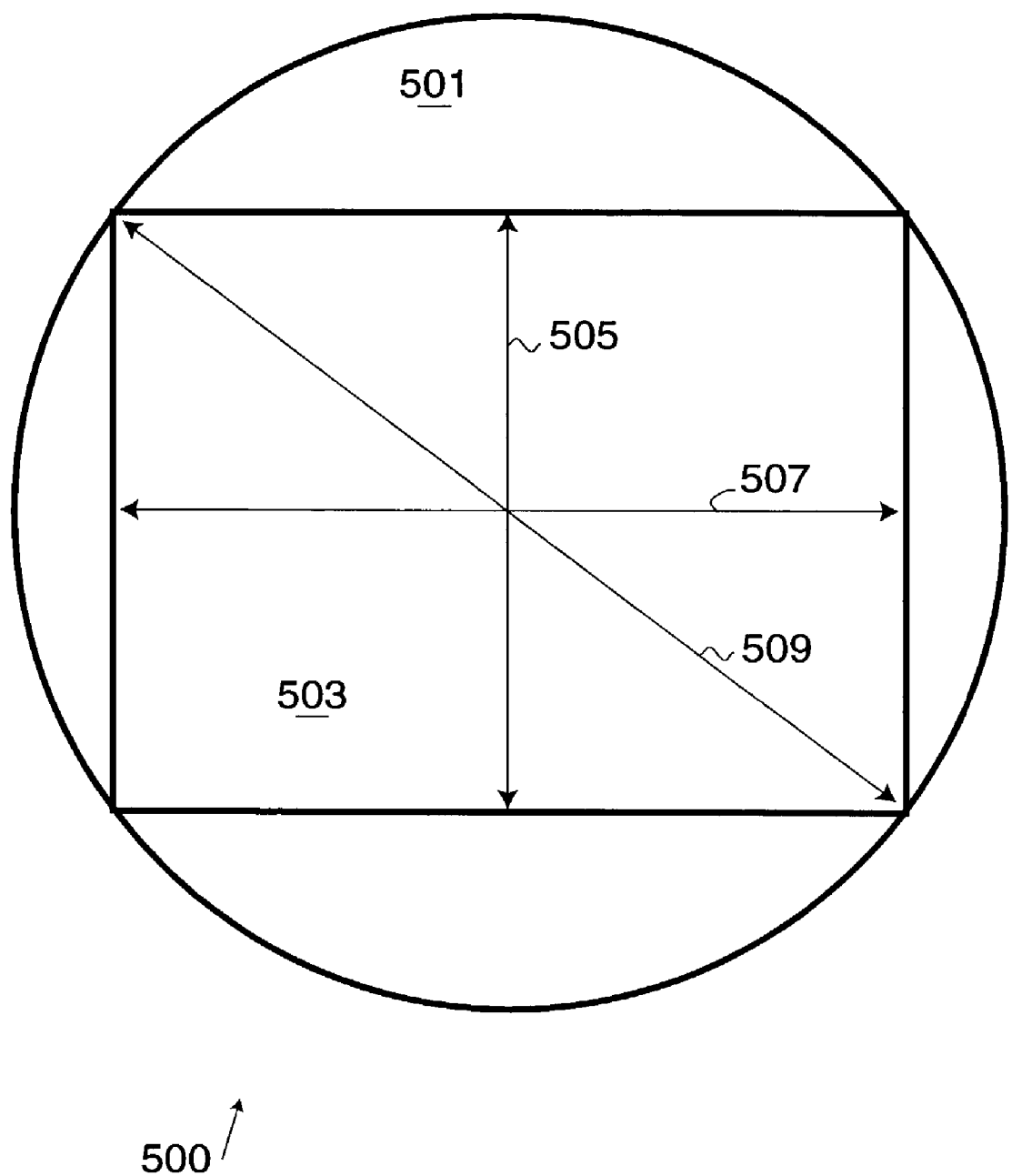
FIG. 5 illustrates a possible illumination of a sensor using a lens designed using the process of FIG. 1.

FIG. 5 illustrates an illumination diagram 500 for an 11.80×8.9 mm optical sensor. One skilled in the art will understand that there is a wide selection of optical sensor detectors and that the discussions herein will also apply to these sensors. The illumination diagram 500 includes an illuminated area 501 that indicates where light captured by a lens system falls on the focal plane. An image sensor 503 is positioned within the illuminated area 501. The image sensor 503 can be positioned so that a 'vertical' capture field 505, a 'horizontal' capture field 507, and a 'diagonal' capture field 509 each are illuminated (other positions can be used—for example—positions where the corners of the sensor are not illuminated). Each of the capture fields depends on the field-of-view of the lens system that captures the light that illuminates the illuminated area 501. Thus, a lens system that has a field-of-view of 145-degrees corresponds to the 'diagonal' capture field 509 (or 72.5-degrees as measured from the axis-of-rotation of the lens system. A lens system for the image sensor 503 can be characterized by the amount of field-of-view corresponding to the 'diagonal' capture field 509 and the 'vertical' capture field 505. Some lens systems capture an annular image (for example, the lens system shown in FIG. 10). In these embodiments, the center of the optical sensor is not illuminated and the captured image is an annular image.

Figure 6:
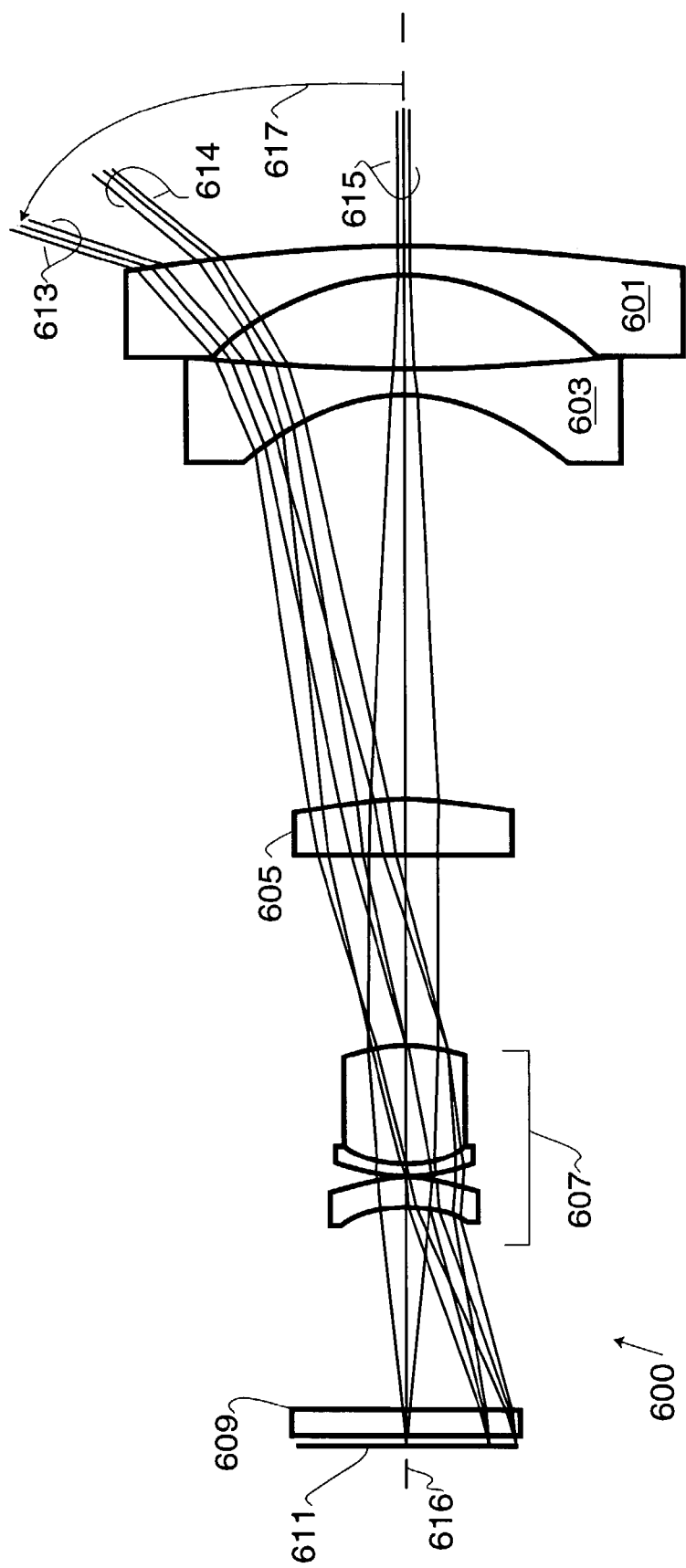
FIG. 6 illustrates a 145-degree wide-angle lens system having an f-theta deviation and designed using the process of FIG. 1.

FIG. 6 illustrates a 145-degree wide-angle lens system 600 having a first lens 601, a second lens 603, a third lens 605, and a lens group 607, configured to capture a 145-degree wide-angle image and to focus that image through a cover glass 609 onto a sensor 611 having the 'diagonal' capture field 509 measuring 8 mm. Table 1 provides material and shape information for one preferred embodiment. Surface 1 corresponds to the first surface of the first lens 601 while surface 7 corresponds to the first surface of the lens group 607. FIG. 6 also shows a first light ray bundle 613, a second light ray bundle 614, and a third light ray bundle 615. The first light ray bundle 613 corresponds to maximum acceptance of the 'diagonal' capture field 509 entering the lens system, the second light ray bundle 614 corresponds to the maximum acceptance of the 'vertical' capture field 505, and the third light ray bundle 615 corresponds to light captured at the center of the image sensor 503.

The 145-degree wide-angle lens system 600 is rotationally symmetric around an axis-of-rotation 616 and can accept the first light ray bundle 613 having a 72.5-degree incident angle 617 from the axis-of-rotation 616.

We relaxed the f-theta design tolerance during the design of the 145-degree wide-angle lens system 600 such that the f-theta deviation at the edge of the field-of-view was about 67% f-theta and about 113% f-theta in the middle of the field-of-view.

Table 1, in light of FIG. 6 and this description, is sufficient for one skilled in the art to practice this embodiment without undue experimentation. Such a one would also understand how to apply the inventive design process to adopt the lens system of FIG. 6 for different format sensors and for different uses.

The 145-degree wide-angle lens system 600 is an example of manipulating f-theta for a particular purpose. Here the portion of the captured image near the axis of the lens system has more separation (thus, more captured resolution) than the portion of the image captured near the edge of the lens system. In addition, an aspherical lens can be added to the lens system to enhance the captured resolution in a particular area of the image (for example, enhancing the resolution for a particular portion of the captured field-of-view where that portion of the field-of-view is considered to be more important than other portions of the field-of-view). One example where this concept can be applied is with target-level surveillance lenses (for example, a 360-degree fish-eye lens mounted on a cash register) where the additional resolution can be used to help resolve the features of the target (that portion of the image from the edge of the lens to about 45-degrees up) while the upward resolution is less important (from about 45-degrees up to the zenith because the ceiling is less interesting than the face of the target). The addition of an aspherical lens in the 145-degree wide-angle lens system 600 can allow the separation at the zenith and the edge of the lens to be the same (or different), while enhancing the separation of a portion of the field-of-view that is of interest.

Figure 7:
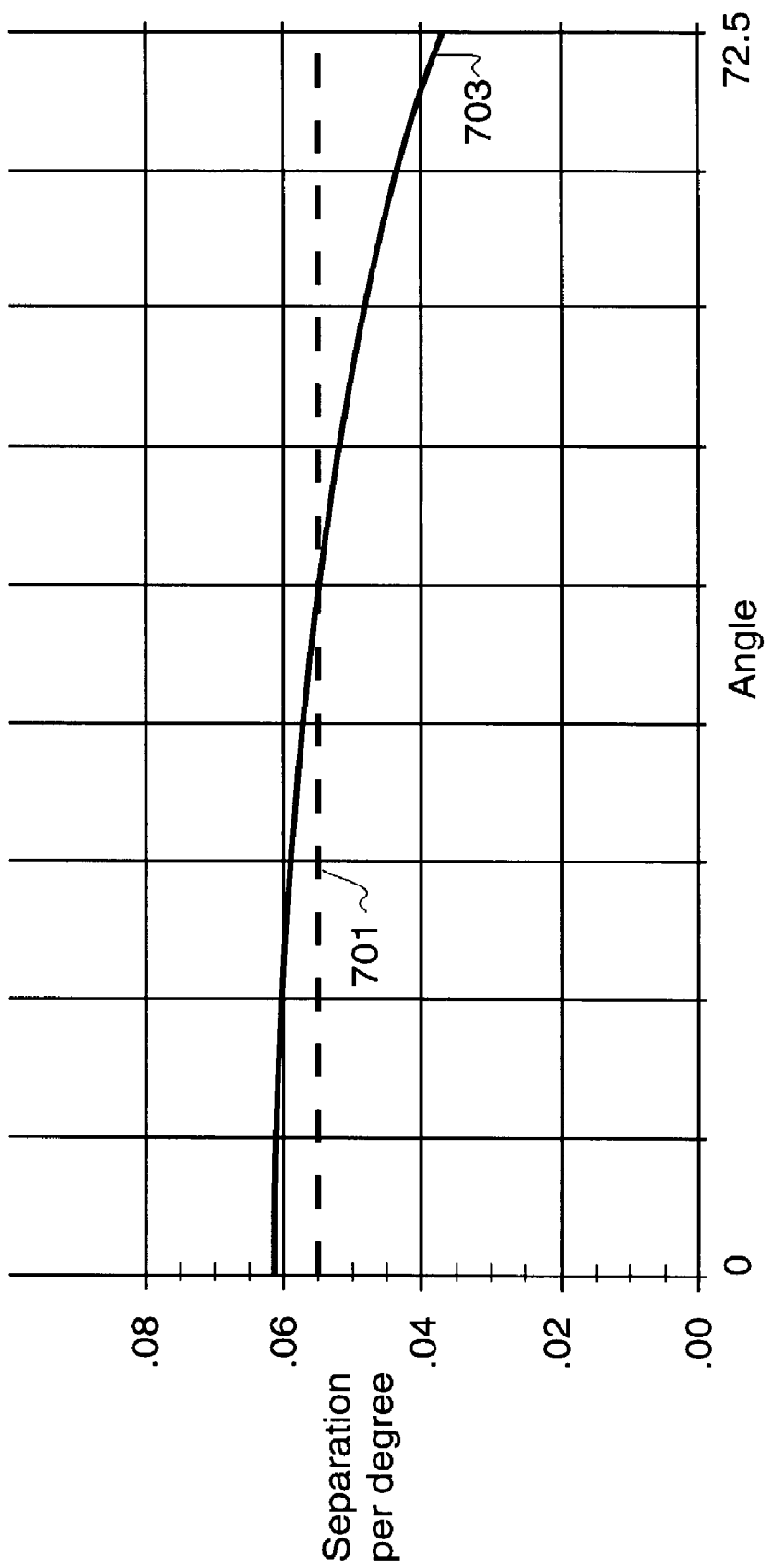
FIG. 7 illustrates the f-theta deviation for the lens system of FIG. 6.

FIG. 7 illustrates an f-theta deviation chart 700 for the 145-degree wide-angle lens system 600 of FIG. 6 that shows the change in the image height per the angle of the light entering the 145-degree wide-angle lens system 600. The horizontal axis indicates the angle of the incident light as measured from the axis-of-rotation 616. The vertical axis indicates the image separation per degree. A linear f-theta plot 701 is determined by dividing the length of the 'diagonal' capture field 509 (8 mm) by the corresponding field-of-view (145-degrees). Thus for a 145-degree wide angle f-theta lens, f-theta is approximately 0.055 mm/degree. The f-theta deviation chart 700 has an actual f-theta plot 703 for the 145-degree wide-angle lens system 600. The actual f-theta plot 703 shows a separation of approximately 0.062 mm/degree corresponding to the third light ray bundle 615

(zero degrees) and approximately 0.037 mm/degree corresponding to the first light ray bundle 613 (72.5-degrees). The difference between the linear f-theta plot 701 and the actual f-theta plot 703 is the f-theta deviation (for this lens system a positive deviation (113%) at the lens zenith and negative deviation (67%) at the lens edge).

Figure 8:
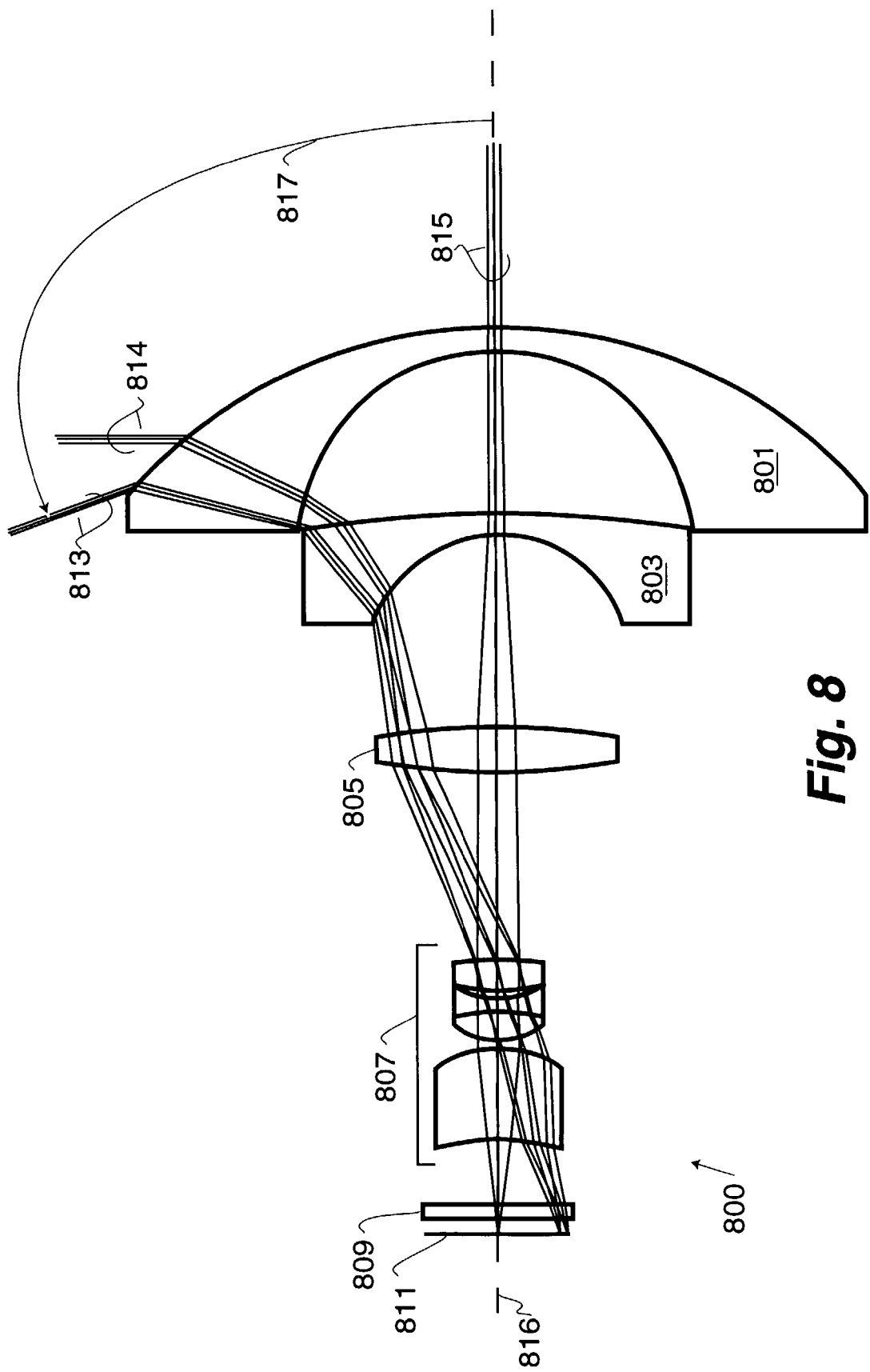
FIG. 8 illustrates 220-degree a wide-angle lens system having an f-theta deviation and designed using the process of FIG. 1.

FIG. 8 illustrates a 220-degree wide-angle lens system 800 having a first lens 801, a second lens 803, a third lens 805, and a lens group 807, configured to capture a 220-degree diagonal wide-angle image and to focus that image through a cover glass 809 onto a sensor 811 with the 'diagonal' capture field 509 being 4.68 mm. FIG. 8 also shows a first light ray bundle 813, a second light ray bundle 814 and a third light ray bundle 815 entering the lens system. The 220-degree wide-angle lens system 800 is rotationally symmetric around an axis-of-rotation 816 and can accept the first light ray bundle 813 having a 110-degree incident angle 817 from the axis-of-rotation 816. Thus, this lens system has a diagonal field-of-view of 220-degrees.

Table 2 provides material and shape information for one preferred embodiment. Surface 1 corresponds to the first surface of the first lens 801 while surface 7 corresponds to the first surface of the lens group 807.

This lens system has a field-of-view of 220 degrees and has an f-theta deviation of about +10 percent at the edge of the lens (thus providing more resolution at the edge of the lens than at the center of the lens). By designing the lens system with this f-theta deviation, we were able to increase the field-of-view for the lens system from about 200 degrees to 220 degrees diagonal.

Table 2, in light of FIG. 8 and this description, is sufficient for one skilled in the art to practice this embodiment without undue experimentation.

Figure 9A:
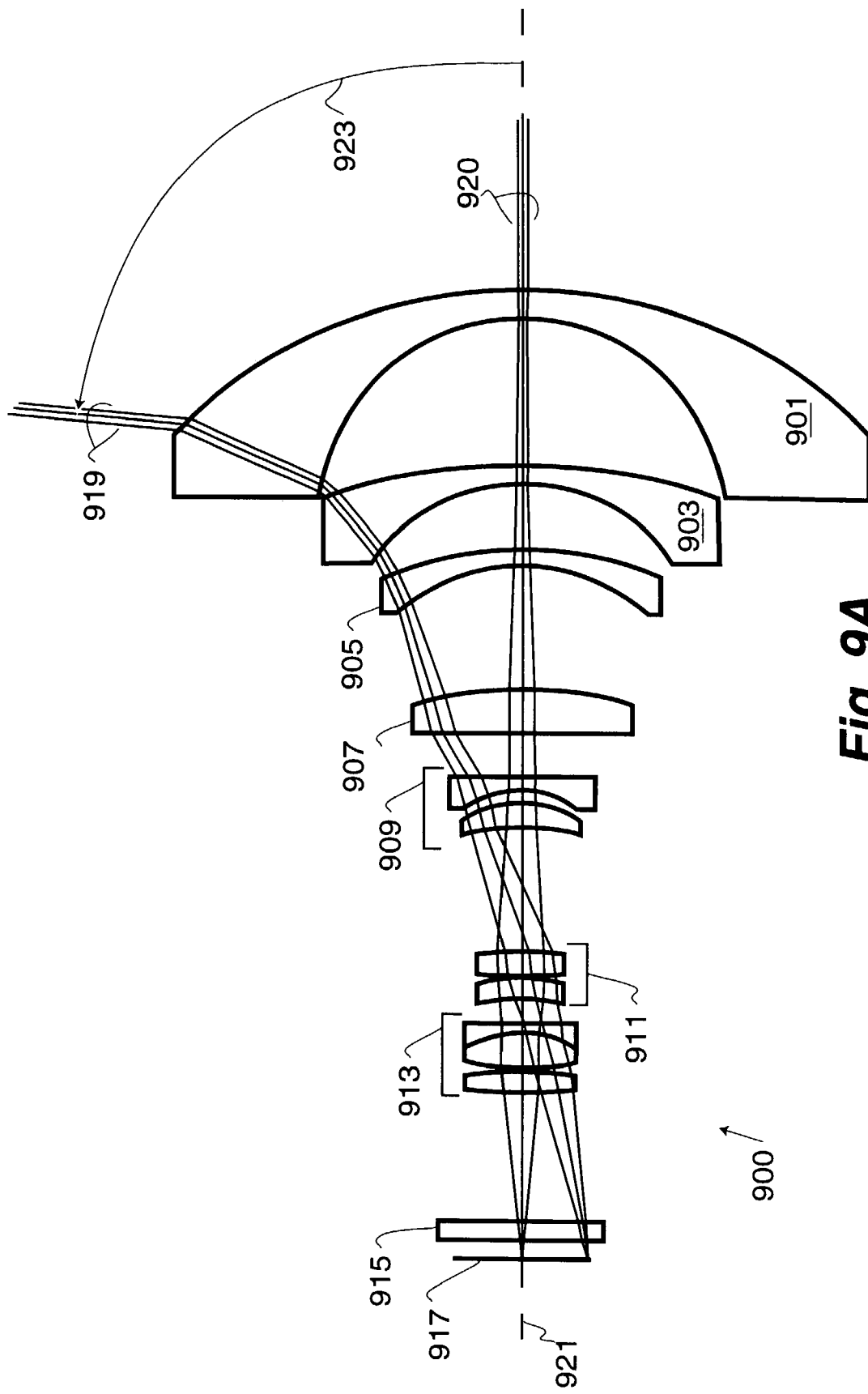
FIG. 9A illustrates wide-angle lens system that zooms from 100 to 140 degrees having an f-theta deviation and designed using the process of FIG. 1.

FIG. 9A illustrates a wide-angle zoom lens system 900 that adjusts the angle of the light captured by the 'vertical' capture field 505 between 100-degrees and 140-degrees. The wide-angle zoom lens system 900 includes a first lens 901, a second lens 903, a third lens 905, a fourth lens 907, a first movable lens group 909, a second moveable lens group 911, and a third moveable lens group 913. The wide-angle zoom lens system 900 is configured to capture a 100- to 140-degree wide-angle image and to focus that image through a cover glass 915 onto the 'vertical' capture field 505 of a sensor 917. For this embodiment, the sensor 917 has the 'horizontal' capture field 507 being of length 11.80 mm, the 'vertical' capture field 505 being of length 8.90 mm and the 'diagonal' capture field 509 being of length 14.78 mm. The sensor 917 can accept image information from a field-of-view of up to 170-degrees across the 'diagonal' capture field 509 of the sensor 917.

By increasing the f-theta deviation to 1.2 f-theta at the edge of the wide-angle zoom lens system 900, we reduced the field-of-view across the 'diagonal' capture field 509 at the sensor 917 (for example, if the lens system was f-theta, the captured field-of-view would be 175.4-degrees instead of the 170-degrees). This reduction in the maximum captured angle significantly reduces the overall system size and manufacturing cost because the design of a zoom lens becomes much more difficult as the angle approaches or exceeds 90 degrees from the zenith (an axis-of-rotation 921). Thus, by increasing f-theta deviation at the edge of the lens system, we reduced the captured angle resulting in a smaller and less expensive lens system.

Figure 9B:
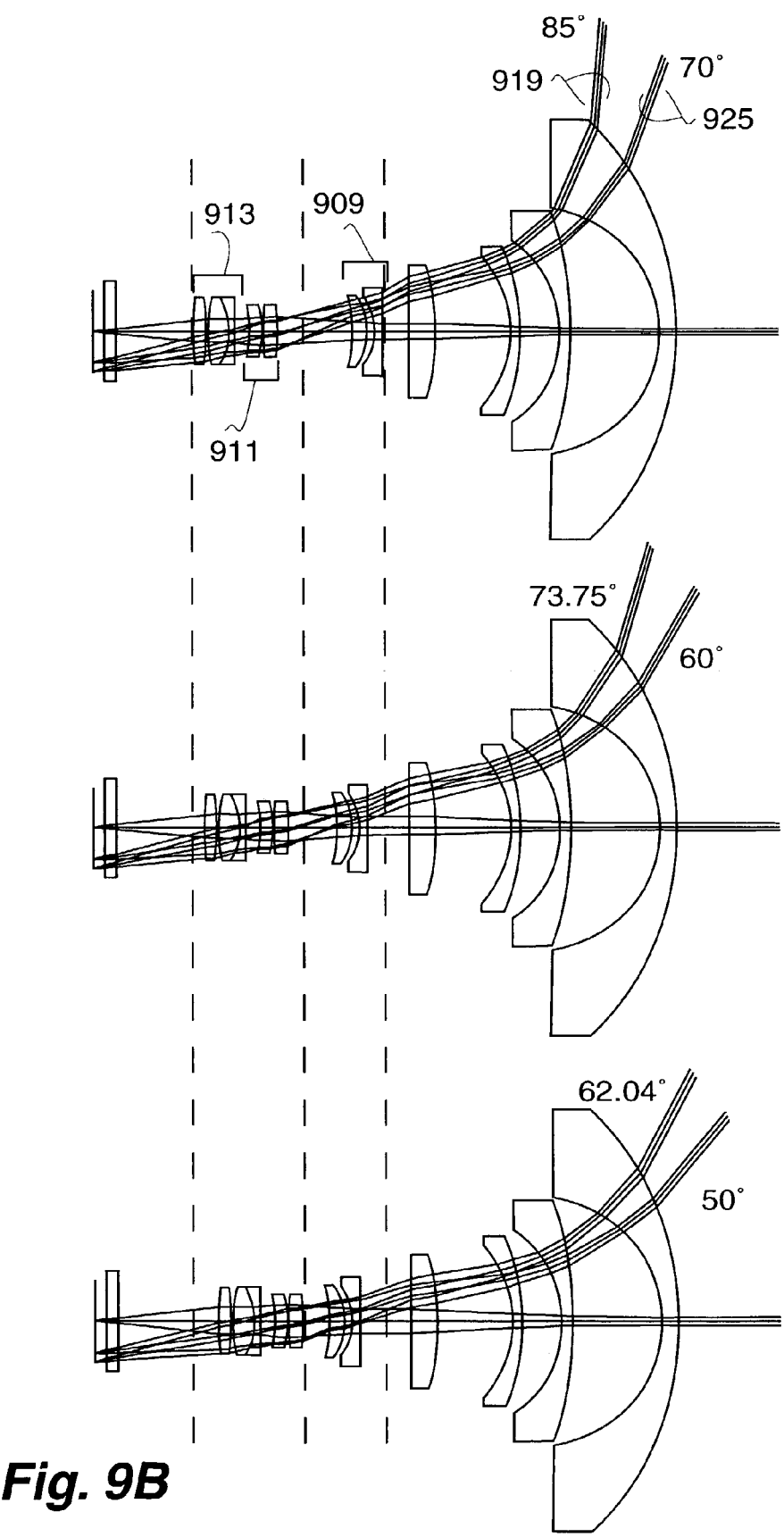
FIG. 9B illustrates positions of the moveable elements of the lens system of FIG. 9A for different levels of zoom.

FIG. 9A also shows a first light ray bundle 919 and a third light ray bundle 920 entering the lens system (a second light ray bundle 925 is discussed in FIG. 9B). The wide-angle zoom lens system 900 is rotationally symmetric around the axis-of-rotation 921 and can accept the first light ray bundle 919 having an included angle 923 of up to 85-degrees from the zenith for the 'diagonal' capture field 509 (captured at the corner of the sensor 917) while capturing up to 70-degrees from the zenith for the 'vertical' capture field 505.

FIG. 9B illustrates shows the wide-angle zoom lens system 900 though the zoom range (where the 'vertical' capture field 505 (corresponding to the second light ray bundle 925) extends from 50 degrees to 70 degrees from the axis-of-rotation 921) illustrating the movement of the first movable lens group 909, the second moveable lens group 911, and the third moveable lens group 913 through the zoom range. The third moveable lens group 913 moves 4.3 mm relative to the focal plane and the first movable lens group 909 moves 4.434 mm relative to the fourth lens 907. The motions are in opposite directions and are non-linear with respect to each other as is well known in the art.

Tables 3 and 4, in light of FIG. 9A, FIG. 9B and this description are sufficient for one skilled in the art to practice this embodiment without undue experimentation. Table 3 discloses the parameters for the wide-angle zoom lens system 900 where the 'vertical' capture field 505 corresponds to 70-degrees from the axis-of-rotation 921. Table 4 discloses the spacing parameters for the wide-angle zoom lens system 900 where the 'vertical' capture field 505 corresponds to 60- and 50-degrees from the zenith (the axis-of-rotation 921).

FIG. 10 illustrates an aspherical catadioptric lens system 1000 having a transparent block that has a first refractive aspherical surface 1001, a first reflective aspherical surface 1003, a second reflective aspherical surface 1005, and a second refractive surface 1007. Light entering the transparent block through the first refractive aspherical surface 1001 exits the block (as is subsequently described) through the second refractive surface 1007 to a first lens group 1009 that contributes to the correction of optical aberrations resulting from the light passing through the transparent block. After the light passes through the first lens group 1009, it continues to a doublet 1010 that collimates the chief rays (telecentricity). The telecentric light then passes through a cover glass 1011 to a sensor 1013. Because the light is telecentric, the sensor 1013 is more uniformly illuminated with respect to the sensor's well depth. Each of the surfaces and lenses are rotationally symmetric about an axis-of-rotation 1015.

In a preferred embodiment, a first light bundle 1017 enters the transparent block through the first refractive aspherical surface 1001 at an angle of 24-degrees (an up-angle 1021) from the axis-of-rotation 1015. A second light bundle 1019 enters the first refractive aspherical surface 1001 at an angle of 110-degrees (a down-angle 1023) from the axis-of-rotation 1015. Once light is refracted by the first refractive aspherical surface 1001, it is reflected by the first reflective aspherical surface 1003 to the second reflective aspherical surface 1005 that reflects the light through the second refractive surface 1007 and out of the transparent block to the first lens group 1009.

The second light bundle 1019 enters the aspherical catadioptric lens system 1000 with a reduced angle of incidence resulting from the combination of the aspherical shape of the first refractive aspherical surface 1001 and the positive f-theta deviation previously discussed. This reduced angle of incidence improves the transmission of light if the first refractive aspherical surface 1001 is not coated, and simplifies the coating design and application if the first refractive aspherical surface 1001 is coated.

In this embodiment, f-theta increases by 30 percent towards the edge (thus increasing the resolution towards the edge of the image). This characteristic makes this embodiment very suitable for video surveillance or teleconferencing applications where the interesting portions of the captured image tend to be lower in the field-of-view. Furthermore, the combination of the aspherical of the first refractive aspherical surface 1001 along with the positive deviation in f-theta helps reduce the angle of incidence at the edge of the first refractive aspherical surface 1001.

The aspherical catadioptric lens system 1000 has a very high geometrical relative illumination throughout. In addition, the maximum angle of incidence on the first surface is only about 42-degrees.

One skilled in the art with the description above, FIG. 10, tables 5 and 6 and the following equation will understand how to practice the invention.

$$z = \frac{cvy^2}{1 + \sqrt{1 - cv(cc+1)y^2}} + ady^4 + aey^6 + afy^8 + agy^{10}$$

where
cc is the conic constant (cc$\equiv -e^2$ where e is ellipticity)
z is along the optical axis
y is the surface height from the axis
cv is the curvature of the base radius $$\left(cv = \frac{1}{\text{radius}}\right)$$

for each aspherical surface, constants cc, ad, ae, af, and ag are provided in table 6.

One skilled in the art will also understand that the invention enables higher performance lenses for less cost where the raw image captured by the lens system can be subsequently processed. Aspects of the invention can be used for lenses on digital still and video cameras where those cameras include the image correction processor. Aspects of the invention can also be used with traditional analog and digital, still or video cameras when the resulting raw image can be processed after capture by the image correction processor (for example, by a programmed computer). Where the raw image is taken through a wide-angle lens, a viewing device can provide the aberration correction at the same time as a view is generated into the wide-angle image.

Each of the disclosed lens systems, as well as any lens system designed in accordance with the method described with respect to FIG. 1 can be used with an image capture system to capture still, movie, video, or similar images.

In addition, additional embodiments of the disclosed lens systems can be constructed of different materials (for example, using different glasses, plastics, or combination of both), and can include aspherical as well as spherical lenses (or combination thereof). Furthermore, although the disclosed embodiments of the lens systems are all of small size, the lenses can be enlarged by one skilled in the art. One skilled in the art with the accompanying figures and this description would also know how to practice the invention to provide lens systems having different focal planes and focal lengths. Further, the use of aspheric lenses (either glass, plastic, or combination thereof) can reduce the number of elements in the lens system and lowering the cost of the lens system.

One skilled in the art will find it advantageous to use glass or plastic molding techniques to manufacture all or part of the lens system.

Although the present invention has been described in terms of the presently preferred embodiments, one skilled in the art will understand that various modifications and alterations may be made without departing from the scope of the invention. In particular, although the disclosed lens systems are wide-angle or catadioptric, the invention can be applied to other types of lenses. Accordingly, the scope of the invention is not to be limited to the particular invention embodiments discussed herein.

TABLE 1

| SRF | RADIUS | THICKNESS | GLASS | NOTES |
|---|---|---|---|---|
| 1 | 64.892199 | 1.000000 | SK16 | |
| 2 | 10.109505 | 3.376154 | AIR | |
| 3 | −68.392662 | 1.000000 | O_S-BSM10 | |
| 4 | 8.562440 | 14.847374 | AIR | |
| 5 | 16.163757 | 2.000000 | SF9 | |
| 6 | 2.6534e+03 | 6.271596 | AIR | |
| AST | — | 0.600158 | AIR | Aperture 1.287 |
| 7 | 6.762951 | 4.475058 | BK7 | |
| 8 | −3.229482 | 0.411613 | SF6 | |
| 9 | −5.971520 | 0.099680 | AIR | |
| 10 | 7.640497 | 1.000000 | SF5 | |
| 11 | 4.612950 | 7.391359 | AIR | |
| 12 | — | 1.000000 | BK7 | |
| 13 | — | 0.250000 | AIR | |
| 14 | — | — | | CCD |

TABLE 2

| SRF | RADIUS | THICKNESS | GLASS | Note |
|---|---|---|---|---|
| 1 | 16.345596 | 0.800000 | H_TAF3 | |
| 2 | 6.598126 | 5.325324 | AIR | |
| 3 | 39.378595 | 0.700000 | H_TAF3 | |
| 4 | 4.379937 | 6.372069 | AIR | |
| 5 | 24.482476 | 1.500000 | SF57 | |
| 6 | −21.614553 | 6.163296 | AIR | |
| AST | — | 0.100000 | AIR | Aperture 0.688 |
| 7 | 12.237031 | 1.000000 | SF57 | |
| 8 | −5.171748 | 0.250000 | AIR | |
| 9 | −2.779017 | 0.400000 | SF57 | |
| 10 | 6.058668 | 0.005000 | CEMENT | |
| 11 | 6.058668 | 0.932768 | FK5 | |
| 12 | −2.315655 | 0.250000 | AIR | |
| 13 | 3.821287 | 3.012084 | FK5 | |
| 14 | 7.211763 | 2.141259 | AIR | |
| 15 | — | 0.500000 | BK7 | |
| 16 | — | 0.500000 | AIR | |
| 17 | — | — | AIR | CCD |

TABLE 3

| SRF | RADIUS | THICKNESS | GLASS | NOTE |
|---|---|---|---|---|
| 2 | 52.795423 | 3.000000 | O_S-LAM60 | |
| 3 | 22.160012 | 15.764738 | AIR | |
| 4 | 63.950100 | 2.000000 | O_S-LAM60 | |
| 5 | 19.394436 | 7.094714 | AIR | |
| 6 | 36.391013 | 2.000000 | O_S-LAM60 | |
| 7 | 20.992958 | 13.157617 | AIR | |
| 8 | 39.875666 | 5.000000 | O_S-LAH53 | |
| 9 | −235.376844 | 4.460752 | AIR | Variable Space |
| 10 | 97.323460 | 1.300000 | O_S-LAL14 | |
| 11 | 8.805862 | 1.597587 | AIR | |
| 12 | 11.886025 | 2.500000 | O_S-TIH53 | |
| 13 | 20.057368 | 11.733666 | AIR | Variable Space |
| AST | — | 2.000000 | AIR | Aperture 2.35 |
| 15 | 46.443253 | 2.500000 | O_S-LAH53 | |
| 16 | −41.608804 | 0.100000 | AIR | |
| 17 | 14.724437 | 2.360000 | O_S-LAH53 | |
| 18 | 19.875760 | 2.612381 | AIR | |
| 19 | −921.096593 | 1.000000 | O_S-TIH53 | |
| 20 | 11.062139 | 0.010000 | CEMENT | |
| 21 | 11.062139 | 4.000000 | O_S-FPL51 | |
| 22 | −20.636665 | 0.100000 | AIR | |
| 23 | 29.145416 | 2.360000 | 0 S-FPL51 | |
| 24 | −47.032232 | 13.952189 | AIR | Variable Space |
| 25 | — | 2.000000 | O S-BSL7 | Window/Filter |
| 26 | — | 2.000000 | AIR | |
| 27 | — | — | AIR | CCD Diagonal |

TABLE 4

| TYPE | SRF | CFG | VALUE |
|---|---|---|---|
| EBR | 0 | 2 | 0.598100 |
| AP | AST | 2 | 2.471132 |
| TH | 24 | 2 | 15.809755 |
| TH | 13 | 2 | 7.133553 |
| TH | 9 | 2 | 7.203273 |
| ANG | 0 | 2 | 72.500000 |
| EBR | 0 | 3 | 0.724900 |
| AP | AST | 3 | 2.635494 |
| TH | 24 | 3 | 18.251611 |
| TH | 13 | 3 | 2.999970 |
| TH | 9 | 3 | 8.895044 |
| ANG | 0 | 3 | 60.000000 |

TABLE 5

| SRF | RADIUS | THICKNESS | GLASS | NOTE |
|---|---|---|---|---|
| 1 | 5.963240 | — | AIR | Dummy Surface |
| 2 | 5.963240 | 10.702814 | ACRYL | Aspheric |
| 3 | 12.902363 | −8.601010 | REFLECT | Aspheric |
| 4 | −12.583547 | — | ACRYL | |
| 5 | −12.583547 | — | REFLECT | Aspheric |
| 6 | −12.583547 | — | AIR | Dummy Surface |
| 7 | −12.583547 | 8.601010 | ACRYL | |
| 8 | 12.902363 | 0.375000 | AIR | |
| 9 | 1.866446 | 0.700000 | ACRYL | |
| 10 | — | 0.075000 | AIR | |
| 11 | 2.224223 | 0.684738 | STYRE | Aspheric |
| 12 | 1.405233 | 0.100000 | AIR | |
| AST | — | 0.100000 | AIR | 0.24 aperture |
| 14 | −1.384139 | 1.500000 | ACRYL | |
| 15 | −0.905783 | 0.500000 | STYRE | |
| 16 | −1.453070 | 0.100000 | AIR | Aspheric |
| 17 | 4.616173 | 0.500000 | SF57 | |
| 18 | 2.891816 | 1.750000 | O_S-LAL18 | |
| 19 | −7.275114 | 0.850000 | AIR | |
| 20 | — | 0.650000 | BK7 | |
| 21 | — | 0.750000 | AIR | |
| 22 | — | — | AIR | 1/3" CCD |

TABLE 6

| SRF | CC | AD | AE | AF | AG |
|---|---|---|---|---|---|
| 2 | −4.615703 | 9.9368e−05 | 7.5992e−10 | 5.6403e−15 | 3.2634e−20 |
| 3 | −2.321921 | 1.6749e−08 | 1.4444e−11 | 5.8294e−15 | 1.3321e−14 |
| 5 | −114.175570 | 3.1491e−07 | 6.7862e−10 | 5.9355e−14 | 9.2353e−17 |
| 11 | 1.934482 | 0.003467 | −0.011836 | −0.021798 | 0.022057 |
| 16 | −0.152496 | 0.012873 | −0.007605 | 5.8082e−05 | 0.000105 |

What is claimed is:

1. A method for designing a lens system comprising:
   relaxing a first design tolerance for said lens system, said first design tolerance specifying an allowable amount of f-theta deviation in a raw image produced through said lens system, said allowable amount of f-theta deviation capable of being corrected by an image correction processor; and
   enhancing a lens system characteristic that would have been limited by a less relaxed first design tolerance.

2. A lens system designed in accordance with the method of claim 1.

3. An image capture system equipped with the lens system of claim 2, and configured to capture said raw image.

4. An image correction processor configured to correct said allowed aberration from at least a portion of said raw image captured through the lens system of claim 2.

5. The image correction processor of claim 4 wherein said raw image is corrected to generate a corrected image having less of said allowed aberration than that in said raw image.

6. The image correction processor of claim 4 wherein a portion of said raw image is corrected to generate a view being substantially free of said allowed aberration.

7. The image correction processor of claim 4 further comprising a programmed computer configured to correct said allowed aberration in said portion.

8. The image correction processor of claim 4 further comprising a specialized circuitry configured to correct said allowed aberration in said portion.

* * * * *